July 4, 1967  N. R. GOSSELIN  3,329,074
INSTRUMENT FOR VISUAL INSPECTION
Filed July 1, 1963  5 Sheets-Sheet 1

United States Patent Office 3,329,074
Patented July 4, 1967

3,329,074
INSTRUMENT FOR VISUAL INSPECTION
Norman R. Gosselin, Marblehead, Mass., assignor to Iota-Cam Corporation, Lynn, Mass., a corporation of Massachusetts
Filed July 1, 1963, Ser. No. 292,040
12 Claims. (Cl. 95—11)

This invention concerns remote visual inspection of inaccessible areas. It has arisen from my efforts to improve gastroscopic examination of the human stomach for finding pathological conditions, but it is useful in other inaccessible areas.

In prior art gastroscopic examination a flexible tube that supports a light source and can conduct light images is inserted through the mouth in to the stomach. The medical examiner studies the stomach using an eye piece at the outer end of the tube and, to have a permanent record, he takes photographs. One prior art photographic technique has been to employ a reflex camera at the viewing end of the tube, looking through the camera viewer to examine the stomach and taking the pictures when desired, with the advantage that the examiner sees what he photographs. But this technique is unsatisfactory because the reflex camera is very cumbersome to handle near the mouth of a patient, and much light is lost through the light system, affecting the clarity of the viewing and photographs. In another prior art photographic technique, the medical examiner withdraws his visual examining tube from the patient and the patient is made to swallow in its place a tube carrying a small, blindly aimed camera which is manipulated in the stomach while a series of direct photographs are taken. The technique is objectionable because of the lack of knowledge of the precise location of the portions of the stomach being photographed which confuses the medical diagnosis; and sometimes the objects the medical examiner saw in his visual examination are missed entirely. Also the means for actuating the prior art swallowable cameras have introduced an undesirable degree of stiffness into the flexible tube that is swallowed, making the technique difficult for the patient and the medical examiner.

According to my present invention the combination of a miniature, remotely operated camera and remote viewing system are provided whereby the advantages of both of the prior art photographic techniques are obtained without their troublesome disadvantages. According to my invention the viewing tube supports the camera and carries the remote control means, while still being flexible to the proper degrees and sufficiently small to enable swallowing. Despite its smallness the camera according to the invention can have a remotely operated shutter for protecting the film from the viewing light and exposing it only for the desired short time and it can remotely take a series of pictures as well as enable direct examination with the patient swallowing only one device once. The preferred embodiment is of simple construction so that it can be practically made and be simple to operate.

Further, I have realized that gastroscopic examination is greatly improved by perception of the size and location of pathological conditions or other objects by stereoscopic means. The need for parallax adjustment and focus for such a viewing device and the need in such a camera for double aperture and shutter devices present difficult problems for the small sized instrument that is required but according to my invention these problems are solved.

Other objects and features of the invention, last to be mentioned, but of great importance, are to provide the combination, in a flexible, swallowable tube, of a light-image conductive means and remote control means for the swallowed parts of the instrument; to provide a new remote camera shutter mechanism which can operate in a camera small enough to be swallowed; to provide a reliable remote control film wind-up device which can serve in a camera small enough to be swallowed; to provide a stereoscopic viewing instrument which has a size sufficiently small to be swallowed; to provide simple means for adjusting the focus and parallax of a stereoscopic remote viewing instrument; to provide means for fabricating the camera body simply and inexpensively; and in general, to provide an improved remote inspection device.

My invention not only provides improvements in gastroscopic examination; it also enables better probing inspection of remote areas in general, such as inspection of closely wired switchboards, rocket engines, boiler tubes, valves, engine and motor cores and jet engine blades.

My invention will now be explained with reference to the drawings wherein.

Figures 1, 2, 17:
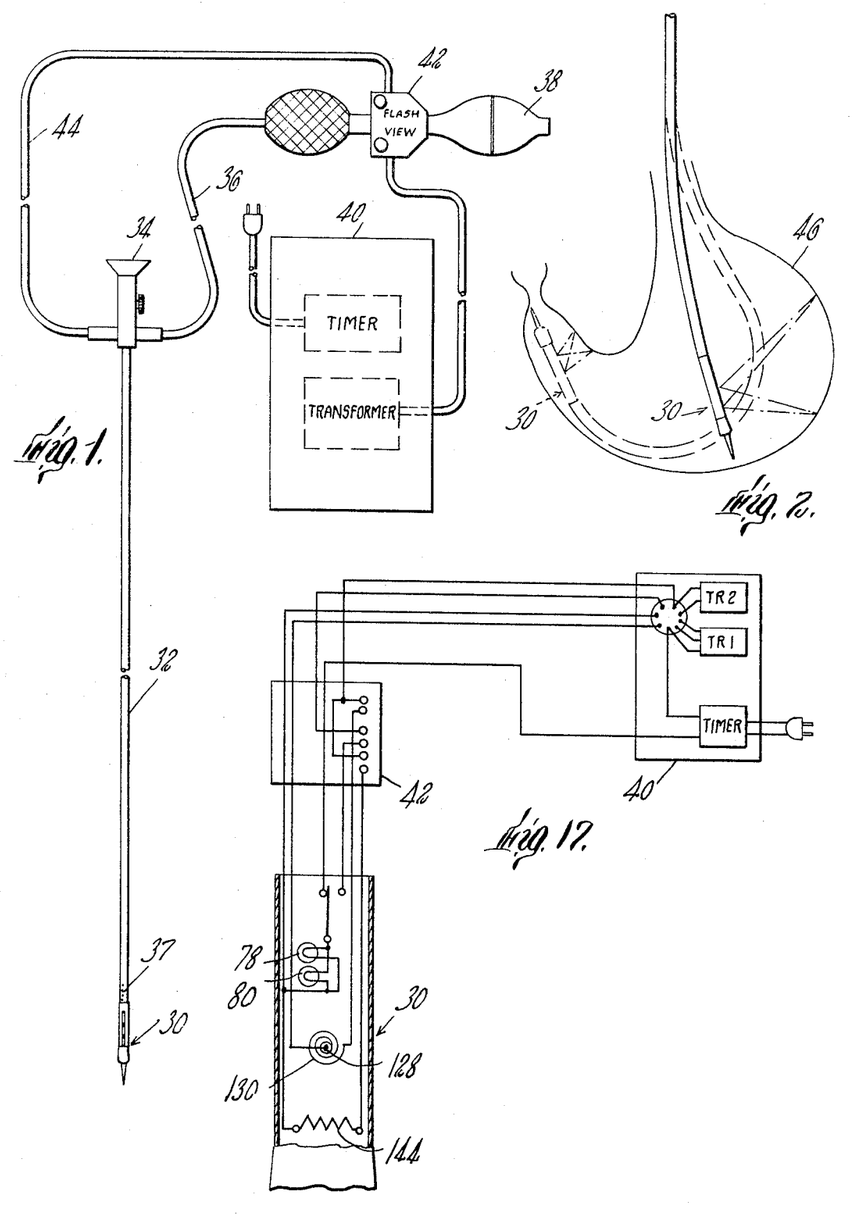
FIG. 1 is a view of a preferred embodiment of a remotely controlled inspection instrument for use by a doctor in examining the stomach of a living being.
FIG. 2 is a diagrammatic view of an inflated stomach into which the probing end of the instrument of FIG. 1 is inserted.
FIG. 17 is a diagrammatic view of the electrical circuits of the instrument.

The camera probe of FIGS. 1–17 is a gastroscopic inspection device that enables stereoscopic photographing with single eye viewing. Referring to FIG. 1, it comprises a probe member 30 housing a camera, the probe of a size to be swallowed, a light-image conductive tube 32 supporting the probe and sufficiently long to extend out from the stomach to an eye piece 34, a stomach inflating means comprising an air-conductive tube 36 and a squeeze bulb 38 for pumping air through the tube 36 and out through the small holes 37 and electrical system comprising an electrical controller 40, a push-button hand knob 42 and electrical wiring 44.

FIG. 2 illustrates diagrammatically the relative size of the probe 30 and a distended stomach 46 and shows various positions of the probe for viewing and photographing.

Referring to FIGS. 3–6, the outer surface of the probe is defined by a stainless steel tubular camera housing 48 that is joined by a number of set screws 50 at one end to the light-image conductive tube 32 and at the other end is threaded to end cap 54 which carries a flexible tip 56 which enables the instrument to pass through the body openings to the stomach.

Figures 3, 4:
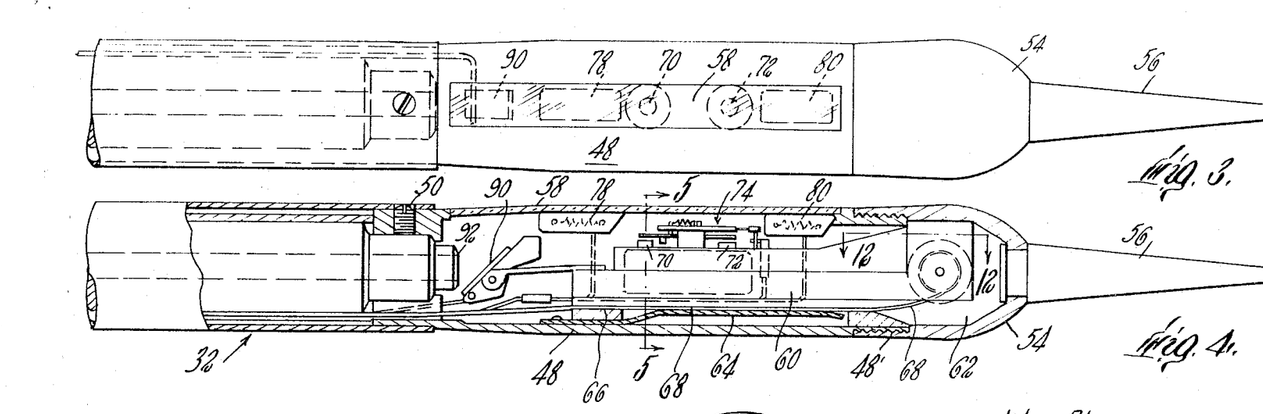
FIG. 3 is a plan view of the probing end of the instrument shown on a highly magnified scale.
FIG. 4 is a partial longitudinal, vertical cross-section of the probe on the same scale as FIG. 3.
Figures 5, 6:
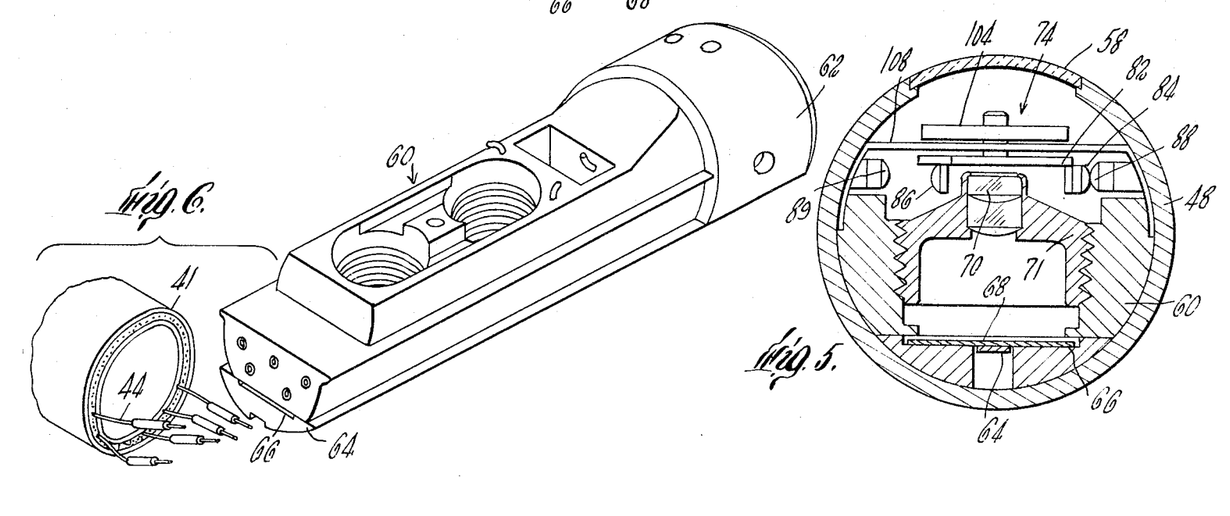
FIG. 5 is a transverse cross-sectional view on line 5—5 of FIG. 4 on a substantialy larger scale than FIG. 4 showing the relation of shutter, lens and film.
FIG. 6 is a perspective view of the camera body of the probe of FIG. 1 and a portion of the flexible tube to which the camera is connected, and showing the film channel.

An elongated opening is provided in the housing 48 into which is sealed a curved transparent pane member 58. An elongated camera body 60 extends through the housing 48. This body has an enlarged lower section 62 which is gripped between the cap 54 and the housing 48 as shown in FIG. 4, securing it in place. A film pressure spring 64 extends under the camera body 60, to press the film 68 in channel 66 upwardly against the camera body. Above the spring are two longitudinally spaced-apart lenses 70 and 72 mounted in the camera body 60. Referring to FIG. 5, lens support rings 71 are threaded to the camera body, supporting the lenses over the film 68.

A shutter mechanism 74 is mounted on the camera body to cover the lenses except when a picture is to be taken, thus enabling illumination of the stomach for viewing without exposing the film. This mechanism will be described below in connection with FIGS. 7–11.

A film take-up mechanism 76, supported on the cap 54 end of the camera body winds the film up by increments. This will be described below with reference to FIGS. 12–16.

Referring further to FIG. 4, two miniature, high intensity electric lamps 78 and 80 are mounted above the camera body 60, one at each side of the lenses 70, 72. The shutter leaf 82 of the shutter mechanism 74, FIGS. 4, 5, carries electrical contacts 84 and 86 which are adapted to engage stationary contact 88 at the closed position and contact 89 at the open position, to energize the lamps at a low voltage for viewing when the shutter leaf is in a closed position, and at a higher voltage when the shutter leaf is in the opened position, for taking the picture. This will be more fully described below in connection with FIGS. 7–11 and the circuit diagram of FIG. 17.

An objective mirror 90 is mounted adjacent the camera body adapted to transmit an image into the end 92 of the image-conductive tube 32, from whence the light is conducted to the eye piece 34. The image-conductive tube could employ a conventional optic system, but it is very advantageous to employ, as is shown, a bundle of elongated, internally reflective, transparent fibers surrounded by a rubber sheath 41 that is reinforced by helical wire. The exposure mechanism is electrically operable and its remote control is achieved by flexible electric wires 44, FIG. 6, that extend along the fiber bundle within the elongated sheath, the entire elongated tubular assembly having sufficient flexibility and being sufficiently small to pass through the body openings and into the stomach of a living being.

The invention provides a miniature camera that can be both very small and reliable, due to the use of an electrically operable exposure mechanism. Advantageously, this mechanism employs an elongated bimetallic strip which has multiple reversions with one end fixed with respect to the camera body and a free portion operatively connected with the member to be driven. This free portion can move back and forth between two positions with electrically produced change in temperature between two levels to drive the member back and forth with it, advantageously, one position being established at ambient temperature, and the other by heating. "Elongated" as here used characterizes the length the bimetallic strip would have if it were straightened into a plane and "reversion" as used characterizes the fact that the elongated member is turned back upon itself, multiple reversions existing, for instance, where the element is bent more than half a turn as in a coil or where it has a number of transverse corrugations. Accordingly, the actual length of an elongated element having multiple reversions is much less than the straightened length so that a long length of bimetal is compacted. Advantageously, as shown in FIG. 1, the remotely controlled exposure mechanism comprises a special shutter mechanism and a special film take-up mechanism each operated by an elongated bimetallic element having multiple reversions.

*The remotely controlled shutter mechanism*

Figure 7:
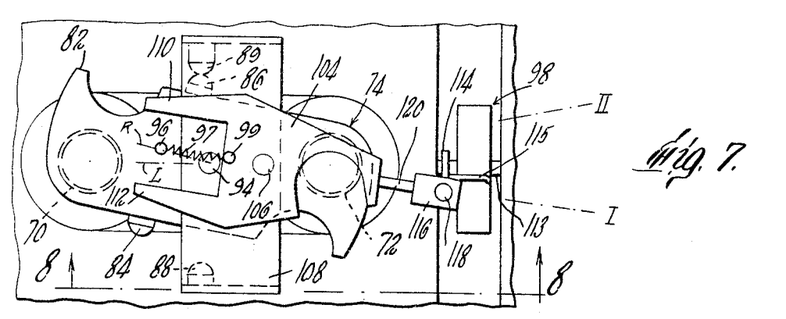
FIG. 7 is a highly magnified plan view of the shutter system of the camera portion of the probe taken on line 7—7 of FIG. 5.
Figure 11:
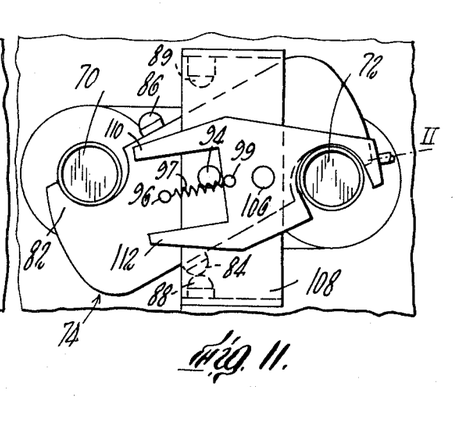
Figure 12:
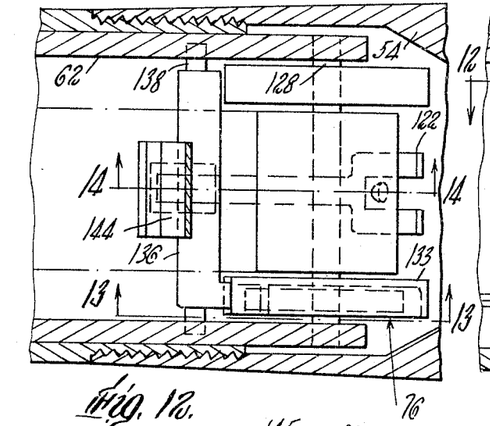
FIG. 12 is a plan view partially in section taken on line 12—12 of FIG. 4, showing the film take-up mechanism of the camera.

Referring to FIGS. 4, 5 and 7–11, the shutter mechanism comprises a shutter leaf 82 pivotally mounted on shaft 94 to turn in a plane perpendicular to the axes of lenses 70 and 72 between an aperture closing position, FIG. 7, and an opening position, FIG. 11. In this embodiment the shutter leaf 82 is a metal sheet having circular portions cut away to register with the lenses in the open position. A pin 96 mounted on the shutter leaf extends upwardly therefrom and affords a means to engage the actuating mechanism. This mechanism comprises a prime mover 98 and an intermediate drive member 104 which links the prime mover with the shutter leaf. The intermediate drive member 104 is pivotally mounted on axle 106 spaced from axis 94 and generally parallel therewith. Axle 106 is mounted on a bracket 108 which is mounted at its ends to the camera body on each side and extends transversely to the camera body over the shutter leaf, between the lenses. The pin 96 of the shutter leaf is on the side of the shutter leaf axis 94 opposite from the center 106 of the intermediate drive member 104 and extends to the plane of the latter. The intermediate drive member 104 has two spaced-apart arms 110 and 112, each extending outwardly from the center 106 beyond the turning circle of the pin 96, providing cam surfaces to engage the pin 96. A tension spring 97 is secured at one end to the pin 96 on the shutter leaf and on the other end is secured to the intermediate drive member 104 at point 99 between the axis 94 of the leaf member and the axis 106 of the pusher member, so that point 99 can move between the axes 94 and 106, crossing the line of centers to operate as a spring-over-center mechanism for rapid movement of the shutter leaf.

Figure 8:
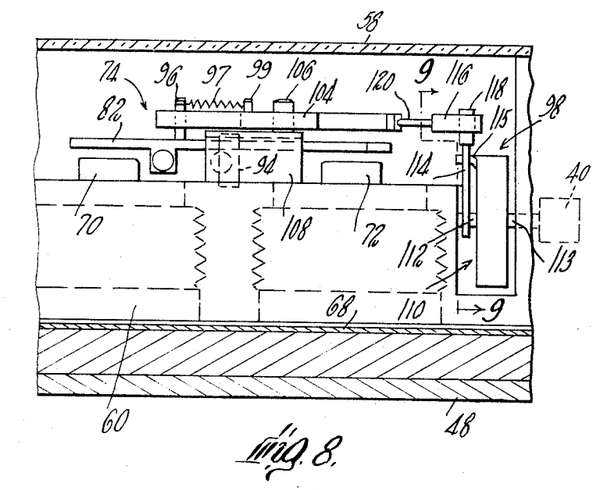
FIG. 8 is a longitudinal, vertical cross-sectional view taken on line 8—8 of FIG. 7.
Figure 9:
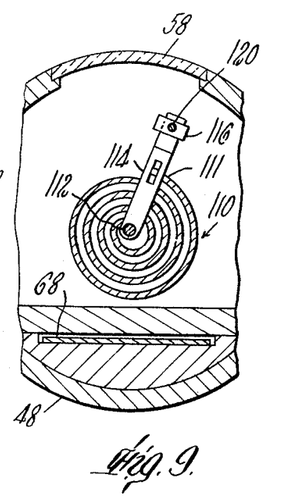
FIG. 9 is a transverse cross-sectional view taken on line 9—9 of FIG. 8.
Figure 10:
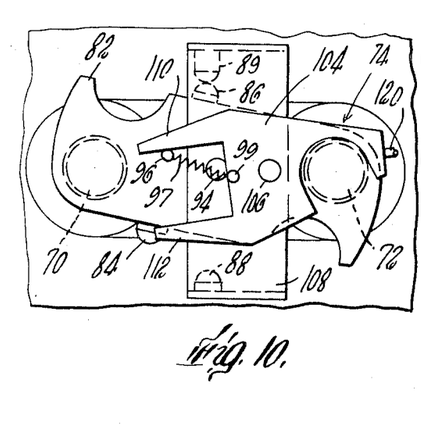
FIGS. 10 and 11 are views similar to FIG. 7 illustrating two successive positions the shutter mechanism takes in opening the shutter.

The shutter prime mover is best seen in FIGS. 7–9. It includes a driver which comprises an elongated bimetallic element 110 that has multiple reversions, the bimetallic element 110 being in the form of a multi-turn coil which has its inner end secured to stationary shaft 112, and its outer end 111 free to move about the shaft. This shaft 112, as shown, is preferably disposed at right angles to the shaft of the shuter leaf, and the outer tip of the bimetallic coil element 110 is disposed to move in a plane substantially parallel to the plane of movement of the shutter leaf 104 as it changes between two temperature levels. Advantageously, the bimetallic element 110 has the proper electrical resistivity to enable heating by a current passing through itself, the shaft 112 and the outer end of the coil 111 having electrical connections 113, 115 through controller 40 (shown digrammatically in FIG. 8) to a power source, the actual wiring being explained in connection with circuit diagram FIG. 17 discussed below. A prime mover lever 114 is pivoted to the shaft 112 and is connected to the outer end 111 of the bimetallic coil 110, adapted to pivot therewith. The rotational movement of this lever 114 is reduced to driving movement of the intermediate drive member 104 through a slide block 116 which has an opening radially aligned with prime mover lever 114 and receiving its end portion 118, which slides in the opening relative to the block 116. The block is pivotally attached to crank 120 of the intermediate drive member so that the lever end 118 can reciprocate relative to the block 116 at various angles without binding. Also, the block 116 can slide longitudinally on the crank 120 enabling the block to conform to the path of the lever end.

The prime mover bimetallic coil 110 is in the ambient temperature condition at position I of FIG. 7, the shutter leaf 82 closing the apertures.

At position I, FIG. 7, the tension spring 97 that connects the shutter leaf 82 and the intermediate drive member 104 is disposed above the shutter radius R that lies through pin 96, and it restrains the shutter leaf 82 from turning. Also the spring causes the electrical contact 86 on the shutter leaf to tightly engage stationary contact 89 mounted on the corresponding side of the U-shaped bracket 108. For taking a picture a voltage, e.g. 1½ volts is applied by the controller 40 and electrical current passes through the bimetallic element causing it to heat and the free end rotates, in reaction against the stationary axle 112 to move lever 114 away from position I towards position II to operate the shutter mechanism. The first increment of movement from position I to position II of the pusher arm 110 of the intermediate drive member 104 carries the point of attachment 99 of the tension spring toward the line of centers L, closer to the leaf shutter center 94, but sufficient tension remains on the spring to keep the contacts 86 and 89 engaged. The arm 110 engages the pin 96, and as this arm rotates, the pin 96 is forced to slide outwardly on the arm 110 and to turn about center 94. For the time when the spring point 99 on the intermediate drive member 104 lies above the radius through the pin 96 and axis 94, the action of arm 110 upon pin 96, causing it to move counterclockwise about center 96 and away from point 99, builds up tension in the spring. As soon as the spring 97 passes over the center 94 of the shutter leaf, FIG. 10, it no longer restrains rotational movement of the pin 96, but causes it to snap quickly counterclockwise about the center 94 breaking engagement between electrical contacts 89 and 86 and moving from the pusher arm 110 to the position shown in FIG. 11 where electrical contact 84 on the shutter leaf engages contact 88 on the U bracket, and the lenses 70 and 72 are uncovered by the shutter leaf 82. The two electrical contacts cause a flash voltage to be applied to the lamps and the picture is taken. The controller is adapted to apply a voltage to the bimetallic coil for only a fraction of a second, so the bimetallic coil quickly cools, and by the reverse of the movement just described, arm 112 engaging the pin 96 for spring-over-center movement, the shutter leaf is automatically suddenly carried back to its original position and the contacts 86 and 89 reengage, re-energizing the lamps at the low-viewing voltage, the whole cycle taking less than one second.

In this preferred embodiment the bimetallic coil has a ³⁄₁₆ inch outer diameter and a .020 inch width, the thickness of the strip being .003 inch and having five coil turns. As an example, I found that the bimetallic strips P675R, Metals and Controls Division of Texas Instrument Company, could, when formed into a coil, perform satisfactorily. The other components of the camera shown in these figures are of similar portions. The over-all length of the camera body is 1¼ inch. The lenses 70, 72 have an aperture of .015 inch, which gives a good depth of field from ¼ inch to 4 inches. The lens support rings 71 have a diameter of .259 and the space between these rings is .016″. The lamps are ¹⁄₃₂ inch in diameter and ⅛ inch long energized at between 3 and 6 volts for viewing and between 10 and 30 volts for flash. Depending upon the selected size of the bimetallic coil or the duration of the heating voltage, the exposure time can be adjusted from one tenth to one one-hundredth of a second.

This unique shutter mechanism is compact and has its prime mover spaced aside from the lenses so as to leave ample room for the close spacing of the two lenses and associated parts, close spacing of the lenses being necessary to obtain a stereophotograph of objects less than four inches away. By employing the linkage described between the bimetallic element and the shutter, the actuation of the shutter is dependent only on the midportion of the movement of the bimetallic element end from positions I and II. This allows a substantial degree of overtravel to accommodate variation in the character of the bimetallic element and its voltage supply without affecting the shutter operation. Thus, the mechanism is reliable and allows variations in manufacture, most important features in practical microminiature cameras.

*The remote controlled film take-up mechanism*

Referring to FIG. 4 and FIGS. 12–16, a take-up of film following exposure is accomplished electrically by a remotely controlled bimetallic device.

Figure 13:
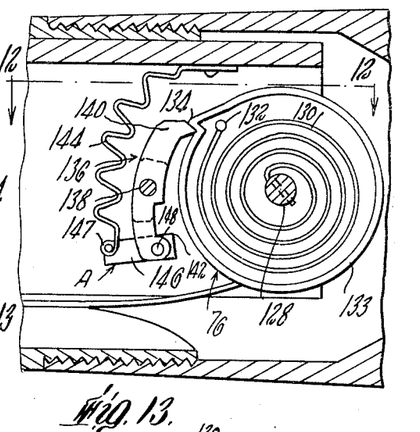
FIGS. 13 and 14 are vertical cross-sectional views taken respectively on lines 13—13 and 14—14 of FIG. 12.
Figure 14:
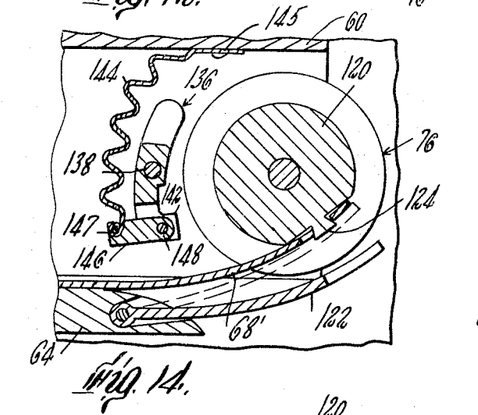
Figure 15:
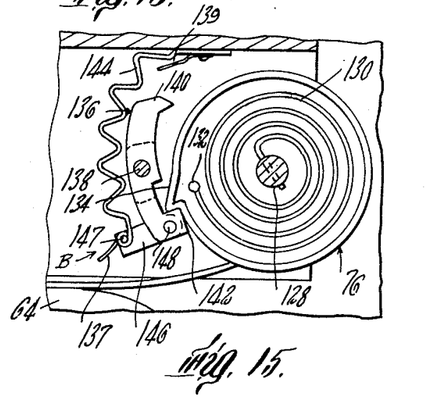
FIG. 15 is a view similar to portions of FIG. 13 illustrating the mechanism in a different position.

The film 68 in the channel 66 below the camera body 60 extends beyond the lenses into engagement with a take-up reel 120 rotatably mounted on stationary axle 128, the latter secured at its ends to camera body portions 62. A coil spring 130 having many turns, a few only being shown, has its inner end secured to stationary axle 128 and its outer end attached to pin 132 on a hub of the rotatable reel 120. The outer periphery of the hub 133 (FIG. 16) is a generally cylindrical cam surface having one cam protrusion 134. An escapement detent 136 is pivotally mounted on shaft 138 mounted to the camera body parallel to the axis of the reel 120. The detent has an upper dog portion 140 and a lower dog portion 142, each adapted to engage the catch 134 of the cam surface while the other is clear, to restrain the take-up reel 120 from moving in response to the spring 130. The movement of the detent and the corresponding movement of the take-up reel is caused by the driver element which comprises an elongated bimetallic strip 144 having multiple reversions, its upper end 145 secured to the camera body 160 and its lower end free to move. The bimetallic element 144 is corrugated with ribs and grooves extending transversely and has a generally arcuate extent about the axis 138 of the escapement detent 136. The lower end of this bimetallic element 144 is pivotally secured to one end of a drag link 146, the opposite end thereof being pivotally attached to the portion of the detent 148 below axis 138 as indicated in FIGS. 13 and 14. Similar to the bimetal element of the shutter mechanism, this bimetal element 144 has electrical resistance for heating itself and electrical connections 137, 139 (FIG. 15) are provided at its two ends by which a voltage can be imposed for heating by controller 40. In operation, the metal spring is wound, tending to rotate the take-up reel counterclockwise. The lower end of a new film piece is engaged on the reel, and dog 140 engages catch 134 preventing rotation of the take-up reel (FIG. 13) and the free end of the element 144 is position A. After a picture is taken, voltage, e.g. one to three volts, is applied to the corrugated bimetal element 144. Heating causes the element 144 to bend carrying its lower end 147 downwardly and counterclockwise relative to the shaft 138 of the detent 136 to position B (FIG. 15). The force thereby applied to the detent overcomes the frictional resistance exerted on dog 140 by the pressure of the spring, so that the detent rotates carrying dog 140 away from the cam protrusion 134, releasing the reel while carrying dog 142 into the path of the cam protrusion whereby the reel 120 is restrained after it moves a short arc. The controller imposes a voltage of a duration, e.g. less than one second, the bimetal element 144 cools, drawing back to its original position, releasing dog 142 from cam protrusion 134, and carrying dog 140 into engagement with the outer cam surface of the hub. The reel continues to complete a full revolution until cam 134 re-engages dog 140, whereby the film 68 is drawn an increment through the channel 66 beneath the camera body 60, to expose the next frame to the stereoscopic lenses. In this preferred embodiment the main spring has a .250 inch outer diameter and .035 inch width with a strength of 18. The corrugated bimetallic element 144, although of only 3/16 inch arcuate length, is capable of moving its outer end over a distance of 3/32 inch long enough to enable quick and relatively powerful movement to overcome the friction exerted on the detent dogs. This bimetallic element has a straightened length of 3/8 inch, is 3/16 inch wide and .008 inch thick.

Figures 16, 23:
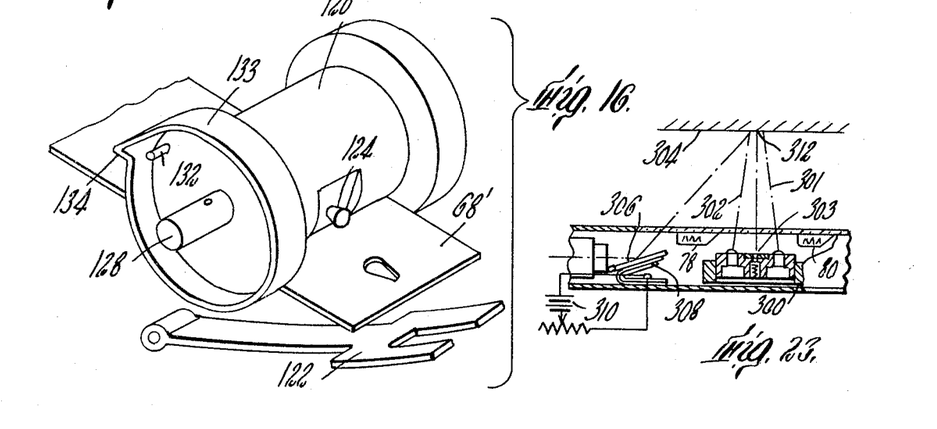
FIG. 16 is an exploded perspective view of portions of the apparatus shown in FIG. 14.

Difficulties in loading due to the small size of the film and take-up reel are avoided by the device shown in FIGS. 14 and 16. The reel has a button 124 adapted to snap into the body of the film. A lever 122 is pivoted to the end of the pressure plate 64 to swing upwardly toward the reel 120. The outer end of the lever is cut away to receive the button and is shaped to move against the reel over the button. When the film is inserted, end portion 68' extends from the channel in position to be attached to the reel. The lever is rotated against the reel and presses the film onto the button 124 as shown in FIG. 14.

When the film is completely exposed, it can be removed in a dark room simply by grasping its free end and pulling it from the reel. The back surface 131 of the cam protrusion 134 is of wedge shape, enabling sliding over the dogs during clockwise rotation of the reel. This rewinds the spring, and the film end can tear to leave the button.

The electrical circuitry

Referring to FIG. 17 the electrical circuitry is shown. A viewing voltage is impressed upon the light bulbs 78, 80 when viewing is desired. When a photograph is desired, a timer in sequence impresses a voltage on the shutter bimetallic element 110, the viewing voltage being interrupted with movement of element 110, the shutter opened and a photographing voltage impressed upon the lights 78 and 80. Upon the end of the timed power pulse to bimetallic element 110, it returns to its normal position and the shutter is closed. Then a timed power pulse is applied to take up bimetallic element 144, which advances the film.

The construction of the camera body

The camera body is injection molded of filled epoxy resin and has a length of 3/4 inch, a maximum diameter of .350 inch and a weight of less than 1/3 ounce. The electrical wires are inserted into the mold before casting, and thus are precast into the structure in their exact position needed for making connections to the mechanism during assembly. One unique feature of the process of forming the camera body is that the metal lens holder rings 71 with a chemical release agent applied to the threads are positioned in the mold instead of using cores, and with casting, the material forms around the threads. After casting, a small spanner wrench breaks the rings loose, leaving openings precisely positioned relative to the other elements of the camera body within a tolerance of less than one thousandth of an inch and exactly corresponding to the ring threads, the same rings being used in the finished camera, eliminating the need for machining or other costly assembly techniques for the miniature elements.

Stereoscopic viewing

Figure 18:
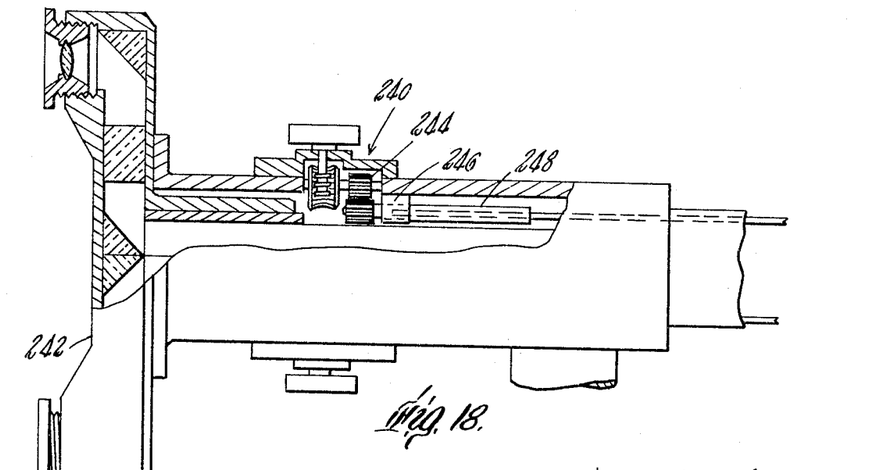
FIG. 18 is a plan view, partially in section of the stereoscopic eye piece of another preferred embodiment of the invention.
Figures 19, 20, 21, 22:
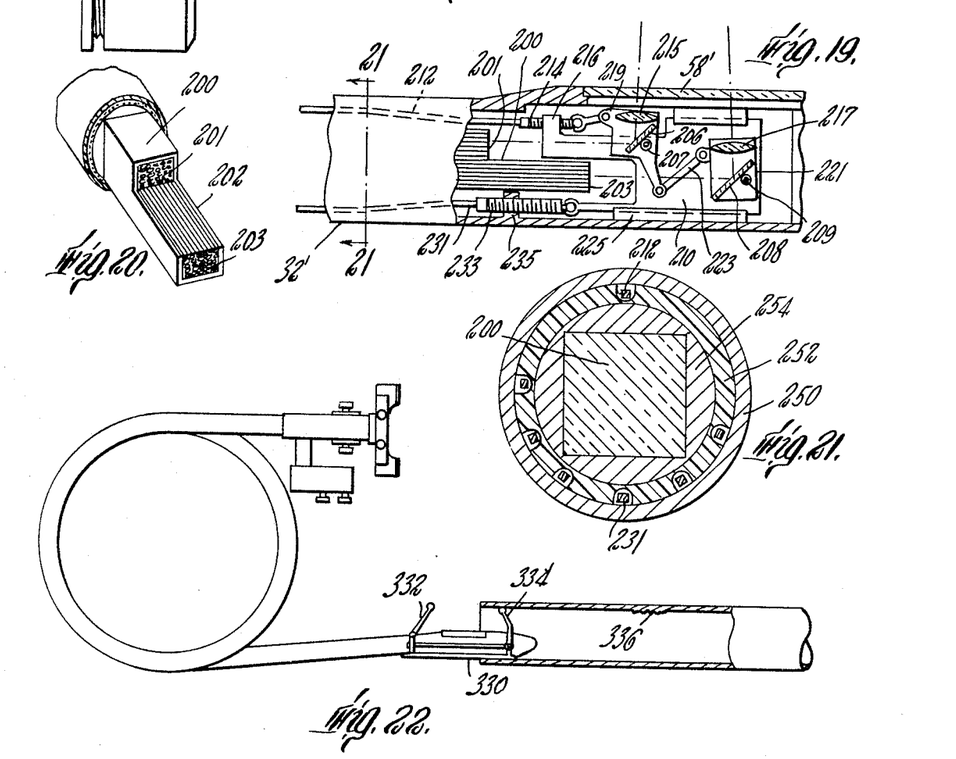
FIG. 19 is a longitudinal cross-sectional view of the objective means of the embodiment of FIG. 18.
FIG. 20 is a highly magnified perspective view of the fiber bundle of FIG. 19, on a greatly magnified scale.
FIG. 21 is a transverse cross-sectional view of the flexible tube of the embodiment of FIG. 18.
FIG. 22 is a plan of a preferred embodiment of the invention for inspecting tubing internally.

Referring to FIGS. 18–21, another preferred embodiment of the invention is the combination of the exact same camera described above cooperating with a stereoscopic viewing system which enables the doctor to see the location and size of lesions as he carries on his gastroscopic examination, and to photograph for later study those stomach portions which the size and depth perception of the viewer show to be possibly pathological. I am able to transmit two images through a single elongated lightconductive tube using only one commercially available bundle of flexible optical fibers which are transparent and internally reflective which is advantageous both as regards cost and as regards flexibility for entering the body of a human being. The well-known principle on which such fibers operate is that light entering the end of a glass rod because of internal reflection, passes back and forth and does not escape through the sides but is transmitted along the rod length. Quartz fibers having a surface layer of glass of a lower refractive index and each having a diameter aproaching that of human hair, gathered into an orderly, highly compacted bundle, that is bound together at each of its ends can transmit a light image by breaking it up into separate components with each fiber transmitting its own component of image. Referring to FIG. 20, according to this phase of the invention, the square cross-sectioned fiber bundle 200 at the objective end is cross-ground at two spaced-apart locations, providing ground end faces 201 and 203, one half of the bundle providing an extension 202 beyond face 201 to face 203. A reflective len 206 is mounted over the extension 202, in a light-receiving relation to pane 58' of the swallowable probe and in an image projecting relation to the end face 201 of its bundle. A second reflective lens 208 is similarly mounted at the end face 203. The two lenses are spaced apart between about 1/4 to 1/2 inch, providing for stereoscopic viewing.

To enable focusing for different focal distances, each reflective lens 206, 208 and their respective objective lenses 215, 217 are mounted on brackets 219, 221 which are pivotally mounted at 207 and 209 respectively to a carriage 210. Tiny rotatable flexible cable 212 through threaded member 214 and stationary threaded block 216 is adapted to turn bracket 219 and the corresponding lenses and a link 223 causes dependent, opposite movement of bracket 221, to adjust the two lens systems for parallax. The carriage 210 is mounted in slides 225 for longitudinal movement relative to the flexible tube for focusing the lens system relative to their respective bundle end faces 201, 203. Another tiny flexible cable 231, together with threaded member 233 and end block 235 drives this carriage 210.

Referring to FIG. 18, the tiny flexible cables 212, 231 extend to along the flexible tube to an adjustment device 240 adjacent the stereoscopic eye piece 242. For each tiny cable a gear train 244 drives a sleeve 246 which has a splined opening in which the end 248 of the cable is inserted, the end of the cable being able to shade longitudinally to allow movement as the flexible tube is bent as well as when adjustment is performed. Referring to FIG. 21, inside the tubular sheath 250 a tubular core 252 is inserted with longitudinal grooves for the actuation wires, and a filling 254 positions the fiber bundle 200.

Referring to FIG. 22, a camera similar to the gastroscopic camera of FIG. 18 is adapted to inspect tubing. For this purpose, the undersurface of the probe 330 is adapted to slide on one side of the tube inner surface and two slide positioners 332 and 334 extend to the opposite side of the surface and engage it, holding the camera apart from that side, enabling the photographing of an imperfection such as at 336 seen through the eye piece.

Referring to FIG. 23, I have provided an arrangement for insuring that the eye piece sees the same area that the camera is looking at. For this purpose a light source 300 and small opening 303 capable of projecting a fine beam outwardly are positioned between the lenses, to project a beam generally parallel to the lens axes 301, 302. This light beam produces a bright spot on the wall 304 being inspected which is substantially in alignment with the focus of the lenses. The reflective lens 306 of the light-conductive tube is mounted on one leg of bimetallic V shaped bracket 308 having the other leg secured to the tube. The bimetallic bracket is connected to a variable power supply shown diagrammatically 310. While looking through the eye piece, the operator varies the deflection of the mirror 306 by adjusting the heating power supply until he sees the spot 312 created by the light 300, whereby the instrument is adjusted for parallax.

Numerous of the specific details of this invention can be varied within its spirit and scope.

What is claimed is:

1. A small diameter remote inspection device including a distal end housing for disposition in a remote area, flexible light-image conducting fiber means extending from said distal end housing to the proximal end of said device, the distal end portion of said fiber means comprising two distinct ordered sets of fibers capable of transmitting two distinct images, the end portions of said sets secured together side by side with the end faces of the fibers of said sets disposed in the same direction, the end face of one set displaced axially in the proximal direction from the end face of the other set, a separate mirror associated with each end face, the secured-together end portions of said fiber sets secured to said housing, means mounting said mirrors to said housing in a spaced relationship to direct stereoscopic images from an object located laterally of the axis of the end faces of said fibers into the end faces of said fiber sets, said mirrors being axially movable together to adjust forms, and a stereoscopic viewer means adapted to receive the images from the proximal end of said fibers.

2. The remote inspection device of claim 1 wherein said sets of fibers are joined at least at said distal end of said device as a single bundle with portions of the length of said fibers of one set cut-away to off-set axially the end face of that set of fibers in the proximal direction from the end face of the other set.

3. A remote photographic inspection device comprising a housing movable relative to objects to be inspected, a camera within said housing having a line of sight from its aperture, a view port spaced from said line of sight of said camera, means conducting the image from said view port to a remote operator station, and means extending from said camera to said station by which said camera is operated, a narrow beam light source fixed relative to the aperture of said camera immediately adjacent thereto, said light source aligned to project said beam outwardly in substantial alignment with the axis of said aperture, and said view port including adjustment means for changing the line of sight of said view port including means extending to said operator station by which said adjustment means is operated remotely, whereby the operator, at said remote station, by adjusting said means until the spot illuminated by said narrow beam is seen by way of said view port can determine the position of the camera and the particular object aligned with the line of sight of the camera aperture and thereby can control said photographic inspection.

4. In combination, an elongated, flexible, light-image conductive member, a viewer eye piece means disposed at a first end thereof, a viewer objective means disposed at the second end thereof for transmitting an image into said light-image conductive member, thence to the eye piece means, a lighting means at said second end of said member, a camera supported by said second end of said member and having at least one aperture disposed adjacent said viewer objective means, said aperture aligned with said objective means to receive substantially the same image as said objective means, film holding means adapted to hold film in an exposed relation to said aperture, an exposure mechanism adapted to expose said film to light through said aperture when desired, a flexible remote control means adapted to actuate said exposure mechanism, said flexible remote control means supported with and extending along said light-image conductive member from said camera, said exposure mechanism including a shutter member pivotally mounted to the body of the camera, a bimetallic driving element having one portion fixed and a spaced portion free to move relative to the body of the camera, said free portion drivingly connected to said shutter member to move it between open and closed positions, said bimetallic driving element adapted to be heated, said shutter mounted to move from a first position to a second position when said bimetallic element is heated and back to the first position when the heating is discontinued, and said flexible remote control means comprises an electric wire extending along said light-image conductive member adapted to carry current to heat said bimetallic element, the free portion of said bimetallic element being drivingly connected to said shutter member by a pivotally mounted intermediate drive member, said drive member connected to the free end of said bimetallic element to be driven back and forth thereby, and a spring-over-center means connected between said intermediate drive member and said shutter member to snap said shutter member from one position to the other when the temperature of said bimetallic element is changed.

5. The combination of claim 4 wherein the camera end of the instrument is sized for insertion through the mouth and into the stomach of a living being, said bimetallic element being elongated and having multiple reversions.

6. A camera comprising a housing, an aperture, means for holding a film in exposable relationship to the aperture, a shutter movable to opening and closing positions relative to said aperture, a bimetallic element having one portion fixed with respect to said housing to react thereagainst, and a portion spaced from the first portion free to move, said free portion drivingly connected to said shutter to move it into the opening position when the temperature of said bimetallic element is at a first level and into a closing position when the temperature is at a second level, and electrical means for selectively heating said element, wherein the shutter comprises a pivoted shutter leaf adapted to rotate in a plane over the aperture, the bimetallic element is in the form of a coil and the coil is mounted on an axis substantially at right angles to the axis of said shutter leaf, a prime mover lever pivoted at one end to move in a plane substantially parallel to that of the coil, and having at a point spaced from the pivot point a connection to the outer end of said coil, an intermediate drive member mounted to turn in a plane generally parallel to that of said shutter leaf, operative on rotation to drive said shutter leaf, said intermediate drive member having a crank portion extending to the free end of said prime mover lever, and a sliding block connection between said free end of said prime mover lever and said crank portion of said intermediate member to cause rotational movement of said intermediate member with rotation of said lever.

7. The combination of claim 6 wherein said intermediate drive member is pivoted separately from said shutter leaf, on an axis spaced from but generally parallel to the axis of said shutter leaf, said shutter leaf having a pin extending to the plane of said intermediate drive member, and said intermediate drive member having two arms, one extending on each side of the pin, said arms spaced apart to enable limited independent rotational movement of the pin and its shutter leaf, a tension spring mounted on one end to said intermediate drive member to turn with said member across the line of axial centers and between said centers of said intermediate drive member and said shutter leaf, and the other end of said tension spring connected to said pin, said pin being positioned on the side of the axis of said shutter leaf opposite from the side by which said first end of said spring turns so that said spring passes over the shutter leaf axial center during movement of said shutter leaf between open and close positions, each arm of said intermediate driving member being constructed and arranged to push said pin to carry said spring over said shutter leaf axial center, one in the shutter closing direction and the other in the shutter opening direction.

8. A camera comprising a housing, an aperture, means for holding a film in exposable relationship to the aperture, a shutter movable to opening and closing positions relative to said aperture, a bimetallic element having one portion fixed with respect to said housing to react thereagainst, and a portion spaced from the first portion free to move, said free portion drivingly connected to said shutter to move it into the opening position when the temperature of said bimetallic element is at a first level and into a closing position when the temperature is at a second level, and electrical means for selectively heating said element, wherein the camera has two apertures spaced apart stereoscopically, said shutter is pivoted at a point between said apertures and extending over each in the closed position.

9. A camera having a film wind-up means comprising a spring loaded take-up reel, a reel catch mounted to turn with said reel and a cooperating pivoted detent for pivoting into and out of the path of said catch to allow the reel to turn only a limited arc at a time, wherein a bimetallic element having one portion fixed and a spaced-apart portion free to move is adapted to actuate said detent, said free portion being connected to said detent to cause it to pivot, means for heating said bimetallic element for a short duration to cause the detent to pivot on heating, and to return on cooling thus to control the movement of said reel, wherein said pivoted detent comprises an escapement device having two dogs, each adapted to engage said reel catch for restraint as the other is moved clear thereof, said bimetallic element moving one dog into engagement with said reel on heating, and the other into engagement on cooling whereby the reel is enabled to turn a full circle while stopping it is assured when the heating stops.

10. A miniature photographic inspection device comprising an elongated flexible snake-like member which has a distal end sufficiently small to enter the mouth and throat of a human being and a proximal end at which the device is controlled, said device including a camera assembly in its distal end, said camera assembly including an actuatable member for enabling the taking of a photograph, a bimetallic element in said distal end of said snake-like member having one end fixed relative to said member and the opposite end drivingly connected to said actuatable member, and means at said proximal end of said snake-like member for selectively causing current to flow to heat said bimetallic element, thereby to actuate said actuatable member to enable the taking of a photograph.

11. The device of claim 10 wherein said bimetallic element has a multiplicity of reversions, providing a substantial effective length and resultant power.

12. The device of claim 11 wherein said actuatable member comprises a film take-up reel adapted selectively to position unexposed film at the aperture of said camera.

References Cited

UNITED STATES PATENTS

| 2,545,465 | 3/1951 | Hough | 95—18 |
| 2,794,944 | 6/1957 | Laval | 95—11 X |
| 2,850,870 | 9/1958 | Martin | 310—4 |
| 2,947,216 | 8/1960 | Drews | 95—11 |
| 3,068,772 | 12/1962 | MacNeille | 95—44 |
| 3,090,378 | 5/1963 | Sheldon | 128—4 |
| 3,142,235 | 7/1964 | Siegmund | 95—18 X |
| 3,172,344 | 3/1965 | Jackson | 95—11 |

FOREIGN PATENTS 526,644  6/1931  Germany.

JOHN M. HORAN, *Primary Examiner.*